Jan. 16, 1962  W. C. KLANK, JR., ET AL  3,016,912
VENTED LIQUID STORAGE TANK WITH PRIORITY SYSTEM OF SUPPLY
Filed Dec. 14, 1959  2 Sheets-Sheet 1
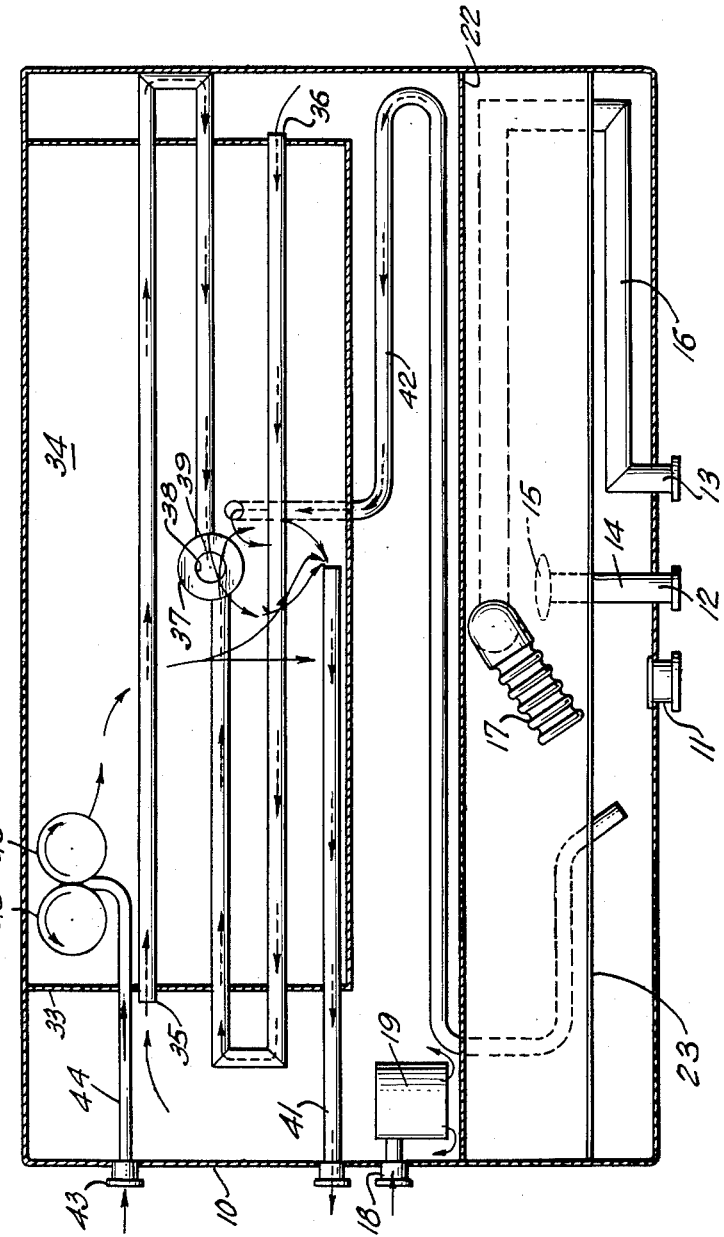
INVENTORS:
WALTER C. KLANK JR
PAUL R. HUGHES
BY J.E. Beringer
THEIR ATTORNEY

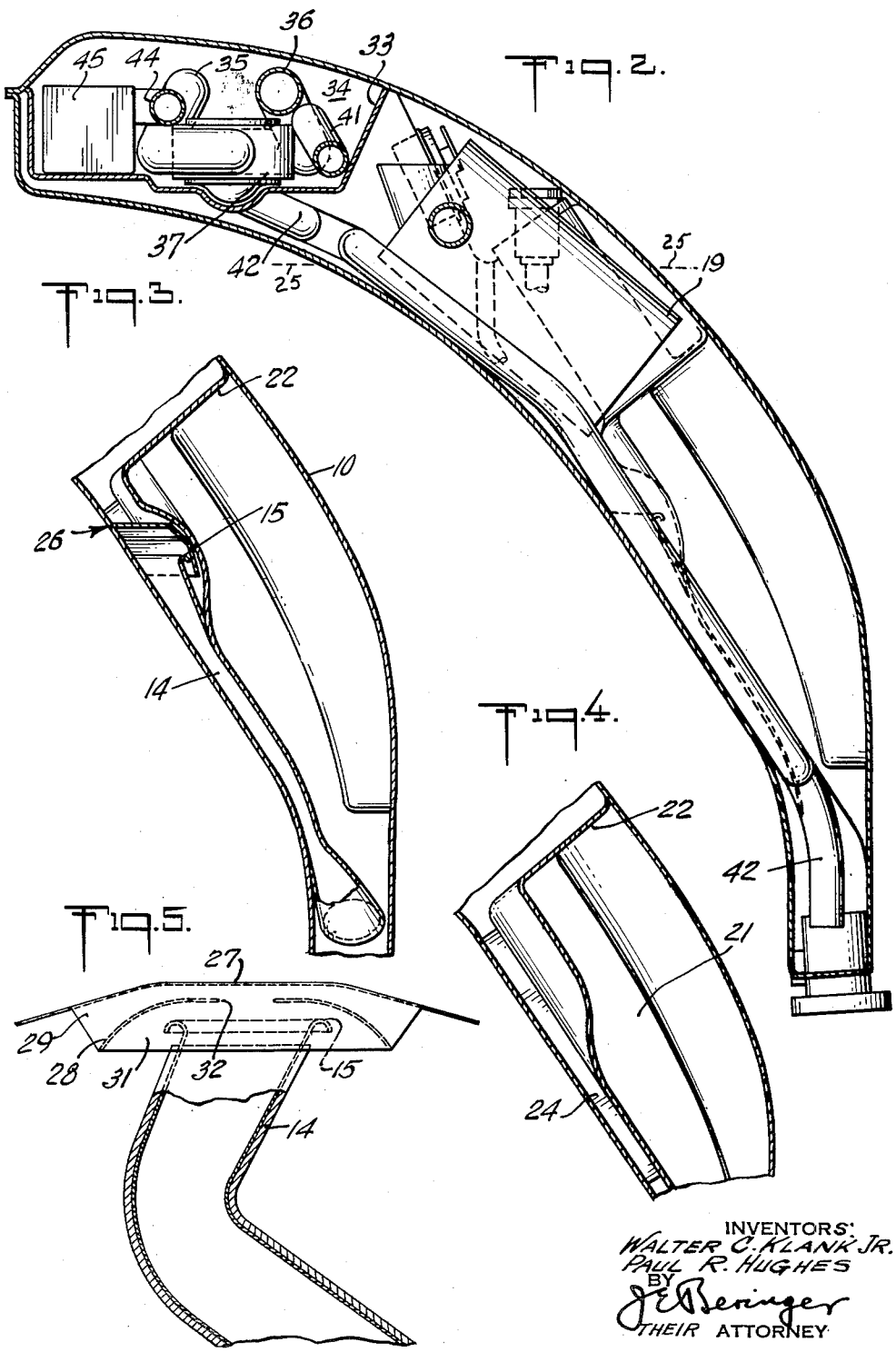

3,016,912
VENTED LIQUID STORAGE TANK WITH
PRIORITY SYSTEM OF SUPPLY
Walter C. Klank, Jr., Dayton, Ohio, and Paul R. Hughes, Los Angeles, Calif., assignors to United Aircraft Products, Inc., Dayton, Ohio, a corporation of Ohio
Filed Dec. 14, 1959, Ser. No. 859,260
7 Claims. (Cl. 137—43)

This invention relates to tanks storing a liquid and useful in vehicles such as aircraft wherein the tank assumes varying attitudes with respect to the earth's surface in correspondence with the movements of the aircraft. While not so limited, the invention has especial application to oil supply systems in aircraft in which a single tank serves as a storage chamber for a plurality of oil using systems, there being a common return to the tank and separate withdrawal therefrom in accordance with a priority system of supply.

An object of the invention is to construct a tank as described with an internal storage chamber in which a limited supply of oil may be held in any flight attitude or maneuver, a feature of the invention providing for continued delivery of oil to said chamber under varying flight conditions.

Another object of the invention is to present a generally new vent system including means to separate a mixture of oil and air supplied to a vent air chamber.

A further object of the invention is to present a liquid outlet for one of the oil systems especially characterized by means to avoid a suction effect whereby oil may be drawn to said system through said outlet after the liquid level has fallen below such outlet.

Other objects and structural details of the invention will appear from the following description when read in connection with the accompanying drawings, wherein:

FIG. 1 is a diagram of a tank in accordance with the illustrated embodiment of the invention;

FIG. 2 is a view in cross section of a typical tank in accordance with the illustrated embodiment of the invention, showing the structural arrangement of the parts therein;

FIG. 3 is a fragmentary view in detail of a lower portion of the tank showing a manifold passage therein in which is located a liquid outlet chute;

FIG. 4 is a view similar to FIG. 3 showing the manifold passage; and

FIG. 5 is a fragmentary view showing in front elevation the chute of FIG. 3 and the protective hood thereover.

Referring to the drawings, a tank in accordance with the illustrated embodiment of the invention is one adapted for use in aircraft to contain an oil for supplying the needs of an engine lubrication system, a hydraulic system and a constant speed drive system. Separate outlets are provided from the tank to the several systems, return flow to the tank being by way of a common inlet. Problems of assigning a priority of supply to the several systems, as well as that of ridding the tank of excess air brought to it with the returning oil, provide the occasion for structural features of the tank to be described.

The tank comprises an outer shell 10 which may have a curved configuration as shown in FIG. 2 for mounting in a space saving relation to a cylindrical surface. The tank interior has a normal lower portion and a normal upper portion, having regard to a normal flight attitude. At what may be considered to be the bottom of the tank shell, since in a normal flight attitude it is the lowermost part of the tank, are oil outlets 11, 12 and 13. Outlet 11 communicates directly with the tank interior in the lowermost portion thereof. Outlet 12 extends inwardly and upwardly in the tank interior in the form of a chute 14 terminating at an intermediate portion of the tank interior in an open mouthed inner end 15. Outlet 13 extends into the tank, and, in the form of a conduit 16 is directed circuitously in the tank interior to communicate with a weighted, flexible pick-up tube 17 suspended from an intermediate portion of the tank. Return oil flow to the tank is by way of a common inlet 18. From the inlet 18 the incoming oil is directed to a vertically disposed deaerator can 19 wherein it is discharged tangentially and swirls downwardly for discharge from the open bottom of the can, entrained air being in the process released and being guided through the open upper end of the can into the normal upper portion of the tank interior. The tank shell is normally partly filled with oil and in the presence of a normal quantity thereof all of the several outlets 11, 12 and 13 are submerged and supplied with oil. In the event of a lowering oil level in the tank, however, it will be understood that the outlet 11 will continue to be supplied as long as any oil remains in the tank. Outlet 12, on the other hand, will have its supply discontinued as the oil level drops below the mouth 15 of chute 14 while outlet 13 will have its supply discontinued when the oil level drops below or beyond the reach of flexible tube 17.

The tube 17 is suspended in a storage chamber 21 defined by a compartment wall 22 which, as seen in FIGS. 2 to 4 has one end joined with one sidewall of the shell 10 and extends transversely across the shell interior toward the opposite sidewall, the compartment wall stopping short of contact with such opposite sidewall and turning downward in a generally vertical fashion toward the bottom portion of the tank shell. The opposite or lower end of the compartment wall, indicated at 23 in FIG. 1, ends above the lowermost part of the tank shell. The compartment wall 22, in conjunction with the first mentioned sidewall of the shell 10 accordingly defines the storage chamber 21 which is cut off from communication with the tank interior at its upper end but is free to communicate with such tank interior through its lower end around the lower edge 23 of the compartment wall and through a manifold passage 24 (FIG. 4) defined by the vertical portion of the compartment wall and the second mentioned adjacent wall of the shell 10. In a normal upright attitude of the tank the storage chamber 21 thus is filled with oil, subject of course to the prevalent oil level, it being understood that the normal oil level lies above the chamber 21 as for example at a point indicated by the line 25 in FIG. 2. Further, in the event of a reversal in the tank attitude, or under the influence of negative gravity forces causing the contained body of oil in the tank to rise into the normal upper portion thereof, a quantity of the oil will be trapped in the chamber 21 and there be available for withdrawal through the tube 17 to the system supplied by outlet 13. It will be understood that the chamber 21 is constructed to define a volume predetermined to supply the outlet 13 throughout a selected time interval. Vent tubes suitably arranged and not shown herein are installed in the compartment wall 22 to communicate the upper part of chamber 21 to the main tank interior above the normal liquid level.

The manifold passage 24 is in underlying relation to the lower end of inlet deaerator can 19, as indicated in FIG. 2. Liquid discharged from the lower end of the deaerator can has a speed of movement forcefully supplied by the pump or other power means utilized to return the oil to the tank. A portion of the discharged oil is directed into the manifold passage 24 where on account of the reduced cross-sectional area of the passage the flow velocity of the liquid tends to be maintained. As a result, the liquid is conducted through the passage 24 at a continuing velocity and so is directed forcefully to the bottom of the tank shell and thence into the chamber 21. The result of such a construction and arrangement of parts is that even under conditions of inverted flight and of negative gravity oil from the inlet 18 continues to reach the storage chamber 21 so that supply to the outlet 13 may be possible over a longer period of time than the selected time interval, if necessary.

The chute 14 is located in the manifold passage 24, as seen in FIGS. 3 and 5. It is thus in the path of movement of the incoming oil from the deaerator can 19. To obviate a direct discharge of such oil into the chute 14 a protective hood 26 is mounted in overlying relation to the mouth 15 of the chute. The hood comprises, as indicated, spaced apart curved plates 27 and 28 defining separate radial passes 29 and 31 to the mouth 15 of the chute. An opening 32 in the plate 28 overlies the mouth 15 and communicates the passes 29 and 31. The curvature of the plate 28 is such as to bring it below the level of the mouth 15. The structure functions thus not only as a protective hood to avoid direct discharge into the chute 14 but also as a suction breaking device obviating a continued flow of oil into the open mouth 15 after the oil level has dropped below the level of the mouth. Air is admitted to the passage 31 above the mouth 15 at the same moment that the oil level reaches and drops slightly below the level of the mouth 15 and while the outer edge of the plate 28 continues to lie in submerged protective relation to the chute.

The tank provides a vent system of generally known design for carrying off air released from the oil in the tank. Briefly, such design includes a compartment wall 33 in the normal upper portion of the tank interior defining an air or vent chamber 34. Tubes 35 and 36 have their one ends communicating with the tank interior on opposite sides of the chamber 34 and pass circuitously through the chamber with their opposite ends terminating in a valve housing 37. Housing 37 has in its upper end an opening 38 and contains a freely rolling ball 39. Normally the ball 39 rests at the bottom of the housing 37 and the tubes or conduits 35 and 36 are open throughout their length to conduct air from the normal upper portion of the tank to the interior of the chamber 34. Under inverted flight or negative gravity conditions, however, the ball 39 moves upward to close the opening 38 and prevent communication of the tubes with the interior of the air chamber thereby preventing a loss of oil from the tank interior to the air chamber. The latter is continuously vented to the exterior of the tank shell through an outlet tube 41. Another tube 42 communicates at its other end directly with the interior of the chamber 34 and extends circuitously and generally downwardly in the tank with its opposite end terminating in the normal lower portion of the tank interior. This tube returns to the tank interior any oil admitted to the chamber 34 and also serves to vent the tank interior above the liquid level under conditions of inverted flight or negative gravity.

The air chamber 34 serves also as a place of discharge for an air-oil mixture withdrawn from the engine sump. This mixture is admitted to the tank by way of an inlet opening 43 and is directed to air chamber 34 by way of a tube 44. Within the air chamber the tube 44 discharges into a pair of deaerator cans 45 and 46 where the air-oil mixture swirls with a separating effect, the oil dropping to the bottom of the air chamber and being carried off by the tube 42 and the air rising in the chamber and being carried away by the vent tube 41. All of the several tubes 35, 36, 41 and 42 are arranged, it will be understood, to obviate or to limit "slugging" of oil into or from the chamber 34 under conditions of changing tank attitude.

What is claimed is:

1. A liquid storage tank assuming in use different attitudes with respect to the earth's surface, including a tank shell defining an interior having normal upper and lower portions, a compartment wall having a lower edge terminating in the normal lower portion of the tank interior and defining a storage compartment communicating with the tank interior proper over the said lower edge of said compartment wall, a liquid outlet communicating with said storage compartment, and a liquid inlet delivering liquid to the tank interior in a downwardly directed path, said compartment wall and the adjacent shell surface defining a restricted path for velocity flow of the liquid to the normal lower portion of the tank interior and over the said lower edge of said compartment wall to maintain flow into said storage compartment during inverted and negative gravity flight conditions.

2. A liquid storage tank according to claim 1, characterized in that said liquid inlet is comprised of a deaerator can intermediately located in the tank interior to discharge incoming liquid over said compartment wall.

3. A liquid storage tank assuming in use different attitudes with respect to the earth's surface, including a tank shell defining an interior having normal upper and lower portions, a compartment wall in said tank interior defining therein a storage compartment, said wall being spaced from the shell to define a manifold passage to the normal lower portion of the tank interior, said compartment wall terminating in said lower portion and defining a storage compartment communicating with the tank interior proper through said manifold passage over the lower edge of said compartment wall, a liquid outlet communicating with said storage compartment, and a liquid inlet communicating with the tank interior above said manifold passage, said storage compartment filling through said manifold passage to a static head equal to the liquid head of the tank interior proper, the liquid in said storage tank being trapped therein under conditions of inverted flight or negative gravity, said liquid inlet discharging liquid under velocity flow, said manifold passage maintaining a velocity flow of the liquid for a continuing movement of liquid into said storage compartment under negative gravity and inverted flight conditions.

4. A liquid storage tank assuming in use different attitudes with respect to the earth's surface, including a tank shell defining an interior having normal upper and lower portions, a compartment wall defining in the normal upper portion of the tank interior an air chamber, an air outlet communicating said chamber with the tank exterior, a conduit communicating at its one end with said air chamber and extending at its opposite end into the normal lower portion of the tank interior, said conduit serving as a vent for the normal lower portion of the tank interior under inverted flight and negative gravity conditions and serving as a drain for liquid trapped in said air chamber in a normal tank attitude, means for venting the normal upper portion of the tank interior through said air chamber, an inlet to said air chamber for a mixture of air and liquid, and means in said air chamber to separate the liquid from the air in said incoming air-liquid mixture.

5. A liquid storage tank according to claim 5, characterized in that said last named means comprises a deaerating can in which the mixture of air and liquid is discharged tangentially to produce a whirling motion thereof in which the air and liquid are separated from one another, the liquid dropping downward into the air chamber to be carried off by said conduit.

6. A liquid storage tank assuming in use different attitudes with respect to the earth's surface, including a tank shell defining an interior having normal upper and lower portions, a liquid inlet to said tank shell including means therein discharging liquid toward the normal lower portion of the tank interior, a liquid outlet in the form of a chute having an open inner end in an intermediate portion of the tank interior in the path of downwardly discharging liquid, and a protective hood over said inner end of said chute making the admission of liquid thereto a function of the liquid level in the tank interior rather than of directional flow from said inlet, said hood comprising vertically spaced apart shield portions defining spaced access passes to said chute the lower one of said passes beginning below the level of said inner end of said chute, the construction of the hood defining a suction breaking arrangement.

7. A liquid storage tank assuming in use different attitudes with respect to the earth's surface, including a tank shell defining an interior having normal upper and lower portions, a compartment wall having a lower edge terminating in the normal lower portion of the tank interior and defining on one side thereof a manifold passage and on the other side thereof a storage compartment communicating with the tank interior proper over the said lower edge of said compartment wall through said manifold passage, a first liquid outlet communicating with said storage compartment, a second liquid outlet including a chute arranged in said manifold passage and having an open inner end terminating in said passage in an intermediate portion of the tank interior, a liquid inlet delivering liquid to the tank interior in a downwardly directed path, the liquid flowing in a continuing velocity through said manifold passage, and a protective hood over said inner end of said chute making the admission of liquid thereto a function of the liquid level in the tank interior.

References Cited in the file of this patent
UNITED STATES PATENTS

| | | |
|---|---|---|
| 1,135,900 | Hughson | Apr. 13, 1915 |
| 2,547,246 | Aspelin | Apr. 3, 1951 |
| 2,942,611 | Klank | June 28, 1960 |
| 2,961,130 | Adams | Nov. 22, 1960 |